(12) United States Patent
Taira et al.

(10) Patent No.: US 9,540,014 B2
(45) Date of Patent: Jan. 10, 2017

(54) ABNORMALITY DETERMINATION SYSTEM AND DETERMINATION METHOD THEREOF

(71) Applicant: TOYOTA JIDOSHA KABUSHIKI KAISHA, Toyota-shi, Aichi-ken (JP)

(72) Inventors: Tetsuya Taira, Nisshin (JP); Yutaka Takaoka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 110 days.

(21) Appl. No.: 14/548,612

(22) Filed: Nov. 20, 2014

(65) Prior Publication Data
US 2015/0151765 A1     Jun. 4, 2015

(30) Foreign Application Priority Data
Nov. 29, 2013    (JP) .................................. 2013-247526

(51) Int. Cl.
*B60W 40/06* (2012.01)
*B60L 11/18* (2006.01)
*G05D 1/02* (2006.01)

(52) U.S. Cl.
CPC ........... *B60W 40/06* (2013.01); *B60L 11/1833* (2013.01); *G05D 1/0225* (2013.01); *G05D 1/0238* (2013.01); *B60L 2260/32* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
None
See application file for complete search history.

(56) References Cited

U.S. PATENT DOCUMENTS

2012/0265391 A1* 10/2012 Letsky ................ A01D 34/008
                                                       701/25

FOREIGN PATENT DOCUMENTS

| JP | 2006231477 | * | 2/2005 | .............. B25J 19/02 |
| JP | A-2007-34769 | | 2/2007 | |
| JP | 2008-287384 A | | 11/2008 | |
| JP | 2010122904 | * | 11/2008 | .............. G05D 1/02 |
| JP | A-2012-130781 | | 7/2012 | |

* cited by examiner

*Primary Examiner* — Mussa A Shaawat
*Assistant Examiner* — Abdhesh Jha
(74) *Attorney, Agent, or Firm* — Oliff PLC

(57) ABSTRACT

An abnormality determination system includes: an autonomous moving object including at least one distance measuring unit that is disposed to face a road surface in a moving direction ant that measures a distance to the road surface; a charging unit including a connection terminal for charging a battery of the autonomous moving object; a stepped portion disposed on a road surface which is subjected to measurement by the distance measuring unit when the autonomous moving object is connected to the connection terminal of the charging unit and is positioned; and a determination unit configured to determine whether the distance to the stepped portion measured by the distance measuring unit at the time of positioning is less than a threshold value.

4 Claims, 10 Drawing Sheets

ABNORMALITY DETERMINATION SYSTEM AND DETERMINATION METHOD THEREOF

INCORPORATION BY REFERENCE

The disclosure of Japanese Patent Application No. 2013-247526 filed on Nov. 29, 2013 including the specification, drawings and abstract is incorporated herein by reference in its entirety.

BACKGROUND OF THE INVENTION

1. Field of the Invention

The present invention relates to an abnormality determination system determining abnormality in a distance measuring unit disposed in an autonomous moving object and a determination method thereof.

2. Description of Related Art

An autonomous moving object is known which prevents a drop or a fall due to a stepped portion or the like by detecting the stepped portion or the like and performing a stopping or avoiding operation when a distance to a road surface measured by a distance measuring unit is greater than a threshold value (for example, see Japanese Patent Application Publication No. 2012-130781 (JP 2012-130781 A)).

SUMMARY OF THE INVENTION

However, for example, although a stepped portion is present, the distance measuring unit may output an abnormal distance value such as a distance value of a horizontal road surface. Therefore, in order for the autonomous moving object to satisfactorily detect a stepped portion or the like, it is necessary to periodically check whether the distance measuring unit normally operates. A user experiences difficulty in checking the distance measuring unit. The invention provides an abnormality determination system that can automatically check abnormality in a distance measuring unit when an autonomous moving object returns to a charging station and a determination method thereof.

A first aspect of the invention relates to an abnormality determination system. The abnormality determination system includes: an autonomous moving object including at least one distance measuring unit that is disposed to face a road surface in a moving direction measures a distance to the road surface; a charging unit including a connection terminal for charging a battery of the autonomous moving object; a stepped portion disposed on a road surface which is subjected to measurement by the distance measuring unit when the autonomous moving object is connected to the connection terminal of the charging unit and is positioned; and a determination unit configured to determine whether the distance to the stepped portion measured by the distance measuring unit at the time of positioning is less than a threshold value.

A second aspect of the invention relates to a method of determining abnormality in at least one distance measuring unit measuring a distance to a road surface in an abnormality determination system including an autonomous moving object, the autonomous moving object including the at least one distance measuring unit disposed to face the road surface in a moving direction, and a charging unit including a connection terminal for charging a battery of the autonomous moving object. The method includes: measuring the distance to a stepped portion by the distance measuring unit when the autonomous moving object is positioned by connection to a connection terminal of the charging unit; and determining whether the measured distance is less than a threshold value. The stepped portion is disposed on the road surface which is subjected to measurement by the distance measuring unit at the time of positioning.

According to the first and second aspects of the invention, it is possible to provide an abnormality determination system that can automatically check abnormality in a distance measuring unit when an autonomous moving object returns to a charging station and a determination method thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiment 1

Figure 1:
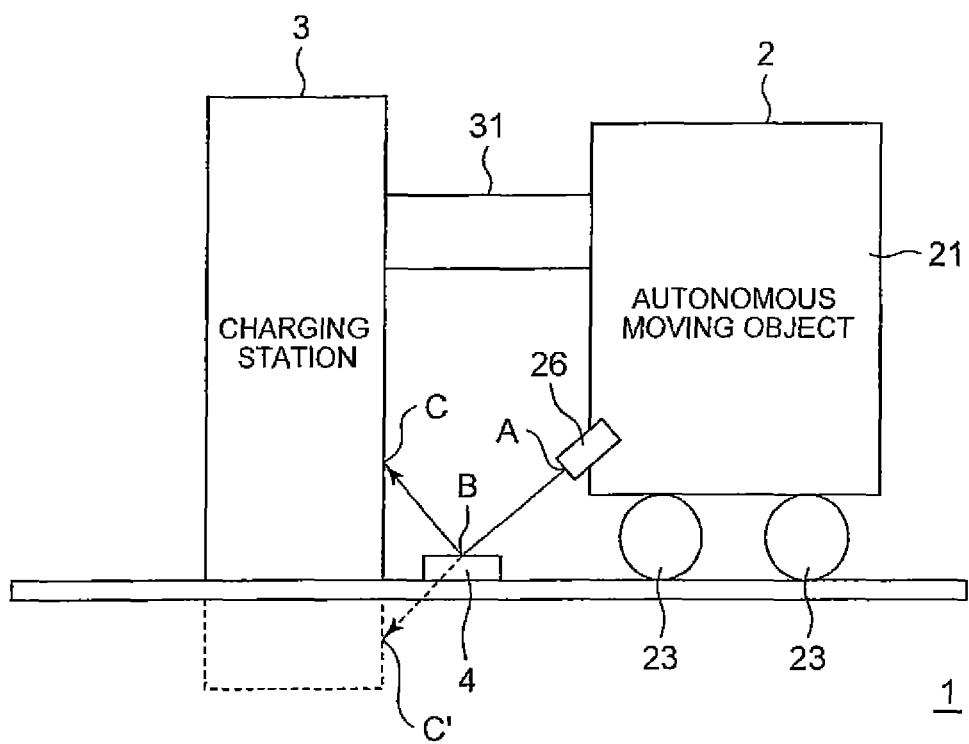
FIG. 1 is a diagram schematically illustrating a configuration of an abnormality determination system according to Embodiment 1 of the invention.
Figure 2:
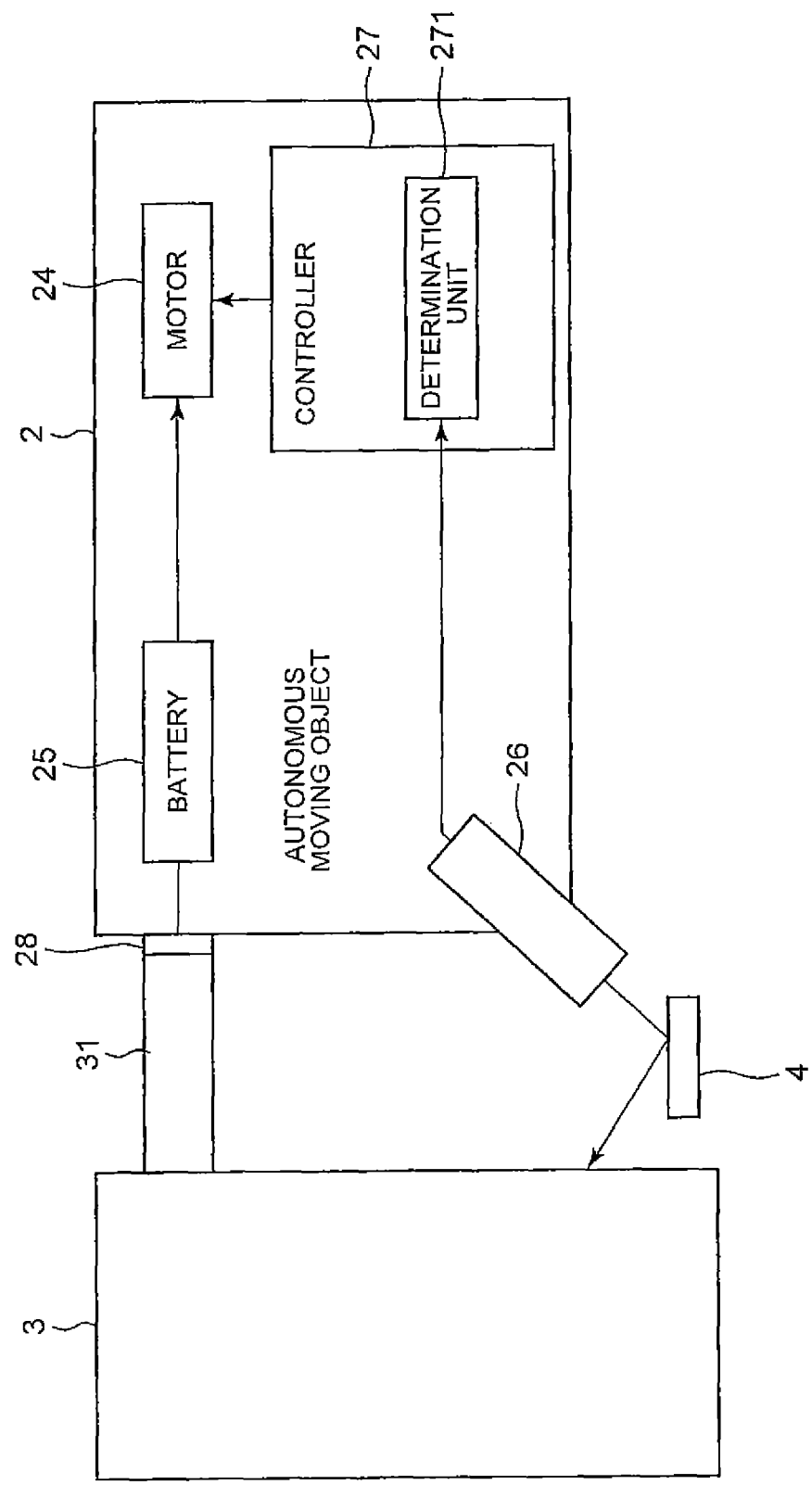
FIG. 2 is a block diagram illustrating the configuration of the abnormality determination system according to Embodiment 1 of the invention.

Hereinafter, embodiments of the invention will be described with reference to the accompanying drawings. FIG. 1 is a diagram schematically illustrating a configuration of an abnormality determination system according to Embodiment 1 of the invention. FIG. 2 is a block diagram illustrating the configuration of the abnormality determination system according to Embodiment 1 of the invention. An abnormality determination system 1 according to Embodiment 1 includes an autonomous moving object 2 including at least one distance sensor 26 and a charging station 3 including a connection terminal 31 for charging a battery 25 of the autonomous moving object 2.

The autonomous moving object 2 includes a moving object body 21, vehicle wheels 23 rotatably disposed in the moving object body 21, a motor 24 driving the vehicle wheels 23, a battery 25 supplying power to the motor 24, the distance sensor 26, and a controller 27 controlling the motor 24 on the basis of the distance measured by the distance sensor 26. The configuration of the autonomous moving object 2 is only an example, and the invention is not limited thereto but may employ any moving object that autonomously moves.

The distance sensor 26 is a specific example of the distance measuring unit, is disposed to face a road surface in a moving direction thereof, and measures a distance to the road surface. For example, the autonomous moving object 2 detects a stepped portion when the distance to the road surface measured by the distance sensor 26 is greater than a predetermined value. The autonomous moving object 2 performs a stopping operation or a stepped portion avoiding operation on the basis of the detected stepped portion.

The charging station 3 is a specific example of the charging unit and includes a connection terminal 31 extending in the horizontal direction. The autonomous moving object 2 is configured to return to the charging station 3 periodically (when the state of charge of the battery 25 is equal to or less than a predetermined value, every predetermined time, or the like). The autonomous moving object 2 is provided with a connection portion 28 for charging the battery 25. When charging the battery 25, the autonomous moving object 2 autonomously moves to connect the connection portion 28 to the connection terminal 31 of the charging station 3. The autonomous moving object 2 is positioned at a predetermined position at the time of charging by the connection terminal 31 of the charging station 3.

However, for example, although a stepped portion is present, the distance sensor may output an abnormal distance value such as a distance value of a horizontal road surface. Therefore, in order for the autonomous moving object to satisfactorily detect a stepped portion or the like, it is necessary to periodically check whether the distance sensor normally operates.

On the contrary, in the abnormality determination system 1 according to Embodiment 1, a pseudo stepped portion 4 is disposed on a road surface which is subjected to measurement by the distance sensor 26 when the autonomous moving object 2 is positioned by connection to the connection terminal 31 of the charging station 3. The controller 27 of the autonomous moving object 2 includes a determination unit 271 configured to determine whether the distance to the stepped portion 4 measured by the distance sensor 26 at the time of positioning is less than a threshold value.

At the position (at the time of charging the autonomous moving object 2) at which the autonomous moving object 2 is positioned for charging by connection to the charging station 3, the distance sensor 26 measures the distance to the stepped portion 4 on the road surface. The determination unit 271 checks whether the distance sensor 26 is abnormal by determining whether the distance measured by the distance sensor 26 is less than the threshold value.

The determination unit 271 is a specific example of the determination unit and determines that the distance sensor 26 is abnormal (abnormality of fixation to a constant value) when the distance to the stepped portion 4 measured by the distance sensor 26 at the time of charging the autonomous moving object 2 is greater than a predetermined threshold value.

Since the autonomous moving object 2 is positioned by the charging station 3, the relative position between the distance sensor 26 and the stepped portion 4 is constant. Accordingly, by comparing the distance to the stepped portion 4 measured by the distance sensor 26 with the predetermined threshold value, it is possible to determine whether the distance sensor 26 is abnormal. In this way, it is possible to automatically check whether the distance sensor 26 is abnormal at the time of charging the battery of the autonomous moving object 2. By adding the step of checking whether the distance sensor 26 is abnormal to a battery charging step which is periodically performed by the autonomous moving object 2, it is possible to further satisfactorily detect the abnormality in the distance sensor 26, thereby improving the reliability thereof.

A mirror 4 as the stepped portion 4 is disposed on the road surface which is subjected to measurement by the distance sensor 26 when the autonomous moving object 2 is positioned by connection to the connection terminal 31 of the charging station 3. The mirror 4 is a specific example of the reflecting portion and reflects an optical signal output from the distance sensor 26. By disposing the mirror 4 on the road surface, the distance measured by the distance sensor 26 can be increased by a reflected light path extended by the reflection from the mirror. That is, the increase in the optical path caused by an actual concave stepped portion can be similarly generated by the reflected light path of the mirror 4.

For example, as illustrated in FIG. 1, the distance L measured by the distance sensor 26 is equal to AB+BC and increases by the reflected light path BC (=BC') extended from the normal distance AB to the mirror 4. The reflected light path BC corresponds to the optical path of the actual concave portion. Accordingly, it is possible to determine the abnormality in the distance sensor 26 in the same way as when the concave portion is actually formed, by simply installing the mirror 4 without actually forming the concave portion.

Figure 3:
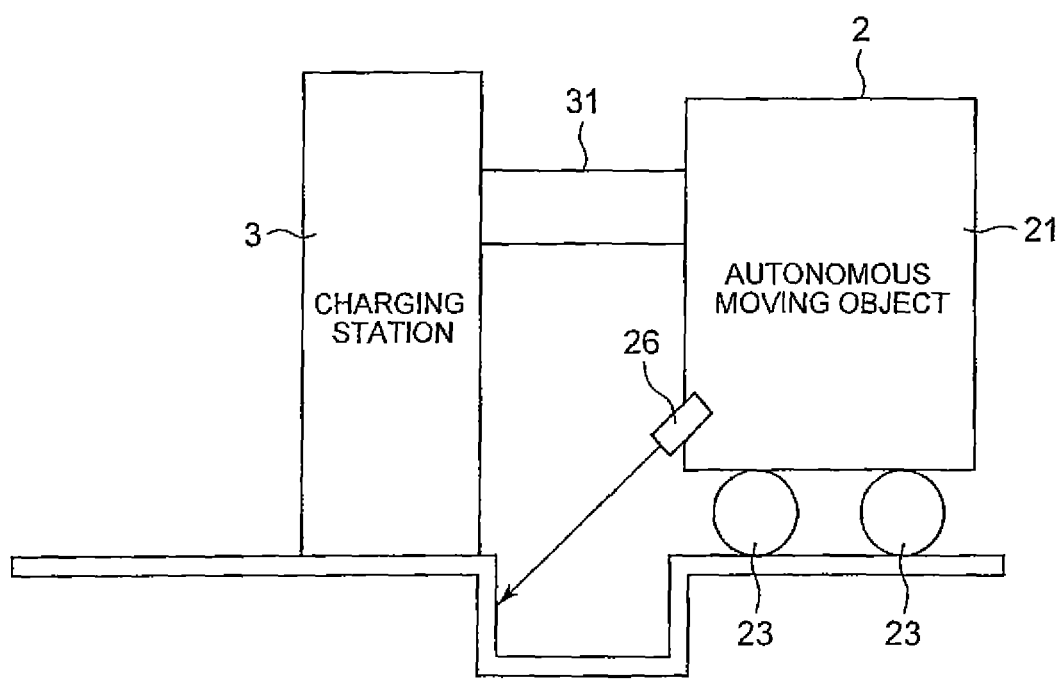
FIG. 3 is a diagram illustrating an example where a concave stepped portion is formed on a road surface which is subjected to measurement by a distance sensor when an autonomous moving object according to Embodiment 1 of the invention is positioned in a charging station.

A concave stepped portion may be formed on the road surface which is subjected to measured by the distance sensor 26 when the autonomous moving object 2 is positioned by connection to the connection terminal 31 of the charging station 3 (FIG. 3).

The determination unit 271 is constituted by hardware such as a microcomputer including a central processing unit (CPU) performing a calculation process and the like, a memory including a read only memory (ROM) or a random access memory (RAM) storing a calculation program and the like which are executed by the CPU, and an interface unit (IF) inputting and outputting signals from and to the outside, The CPU, the memory, and the interface unit are connected to each other via a data bus or the like.

Figure 4:
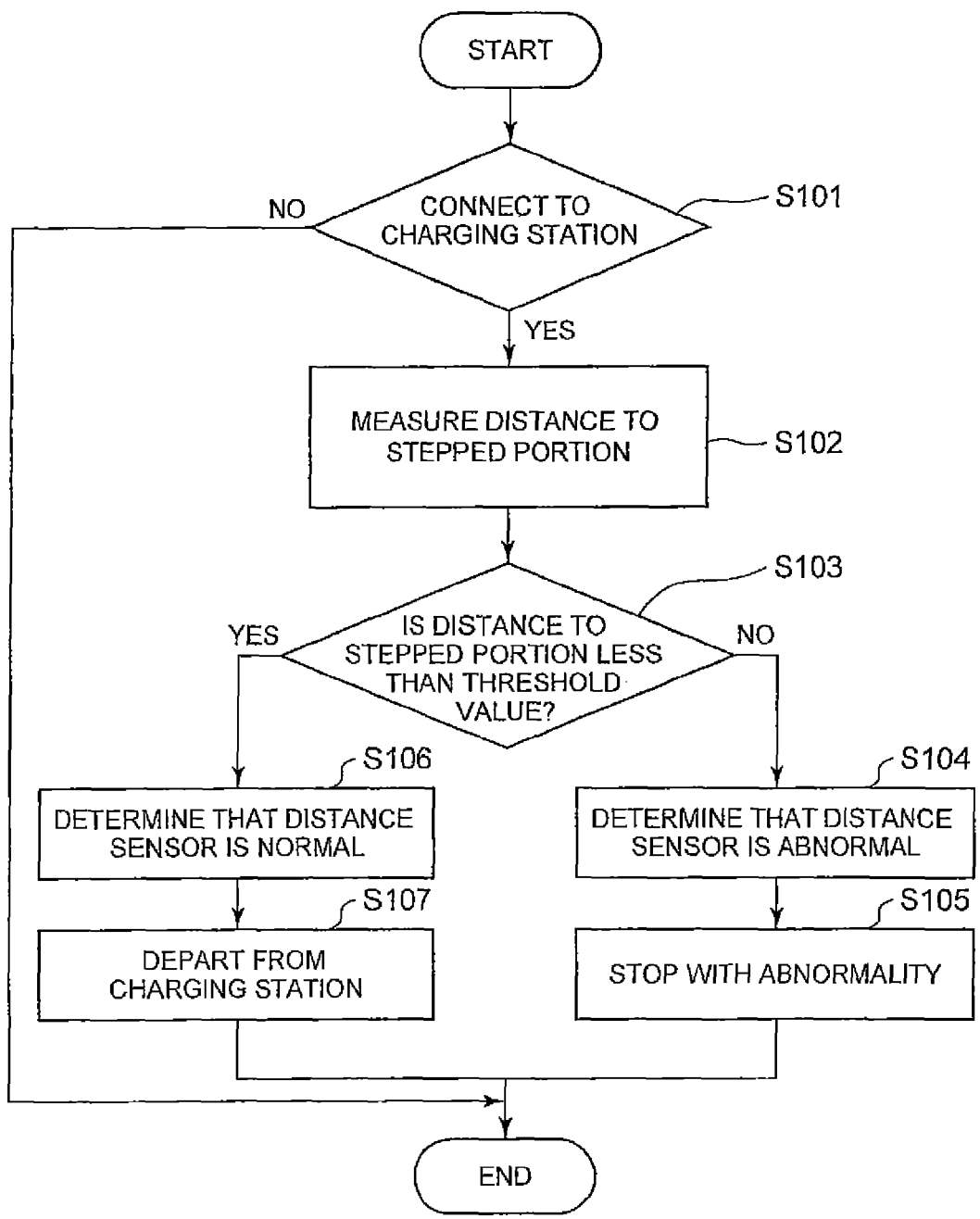
FIG. 4 is a flowchart illustrating a process flow of an abnormality determination method according to Embodiment 1 of the invention.

FIG. 4 is a flowchart illustrating a process flow of an abnormality determination method according to Embodiment 1. For example, when the autonomous moving object 2 receives a movement start command as a trigger for starting movement, it is determined whether the autonomous moving object is connected to the connection terminal 31 of the charging station 3 (step S101).

When it is determined that the autonomous moving object 2 is not connected to the connection terminal 31 of the charging station 3 (NO in step S101), the process flow ends. When it is determined that the autonomous moving object 2 is connected to the connection terminal 31 of the charging station 3 (YES in step S101), the distance sensor 26 measures the distance to the stepped portion 4 of the road surface (step S102).

The determination unit 271 of the controller 27 determines whether the distance to the stepped portion 4 measured by the distance sensor 26 is greater than a threshold value (step S103). When it is determined that the distance to the stepped portion 4 measured by the distance sensor 26 is greater than the threshold value (YES in step S103), the determination unit 271 determines that the distance sensor 26 is abnormal (step S104). In this case, for example, the autonomous moving object 2 maintains the state where the autonomous moving object 2 is connected to the charging station 3 (stop with abnormality) (step S105). When it is determined that the distance sensor 26 is abnormal, the determination unit 271 may give a warning to a user using a warning unit. Examples of the warning unit include a speaker outputting warning sound, a display displaying a warning, and a warning lamp emitting warning light or flickering.

On the other hand, when it is determined that the distance to the stepped portion 4 measured by the distance sensor 26 is not greater than a threshold value (NO in step S103), the determination unit 271 determines that the distance sensor 26 is normal (step S106). In this case, for example, the autonomous moving object 2 departs from the charging station 3 and starts the movement thereof (step S107).

In the above-mentioned abnormality determination system 1 according to Embodiment 1, the pseudo stepped portion 4 is disposed on the road surface which is subjected to measurement by the distance sensor 26 when the autonomous moving object 2 is positioned by connection to the connection terminal 31 of the charging station 3. The controller 27 of the autonomous moving object 2 includes the determination unit 271 configured to determine whether the distance to the stepped portion 4 measured by the distance sensor 26 at the time of positioning is less than a threshold value. Accordingly, it is possible to automatically check whether the distance sensor 26 is abnormal at the time of charging the battery of the autonomous moving object 2.
Embodiment 2

Figure 5:
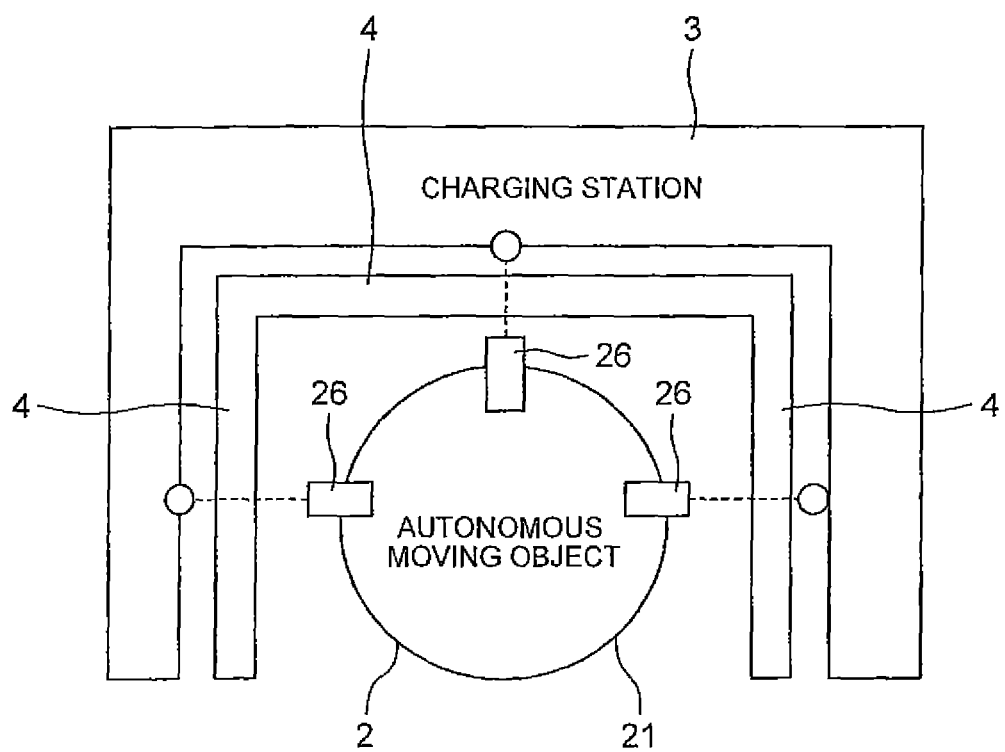
FIG. 5 is a diagram illustrating an example where mirrors are arranged in a U shape on a road surface which is subjected to measurement by distance sensors in Embodiment 2 of the invention.

In Embodiment 2 of the invention, the autonomous moving object 2 may include plural distance sensors 26 along the outer circumference thereof. In this case, stepped portions, that is, mirrors 4, are installed on the road surface which is subjected to measurement by the distance sensors 26 when the autonomous moving object 2 is positioned with respect to the charging station 3. For example, as illustrated in FIG. 5, when three distance sensors 26 are arranged at equal intervals on the front side of the autonomous moving object 2, the mirrors 4 are arranged substantially in a U shape on the road surface which is subjected to measurement by the distance sensors 26. Accordingly, it is possible to simultaneously check the abnormality in the three distance sensors 26.

Figure 6:
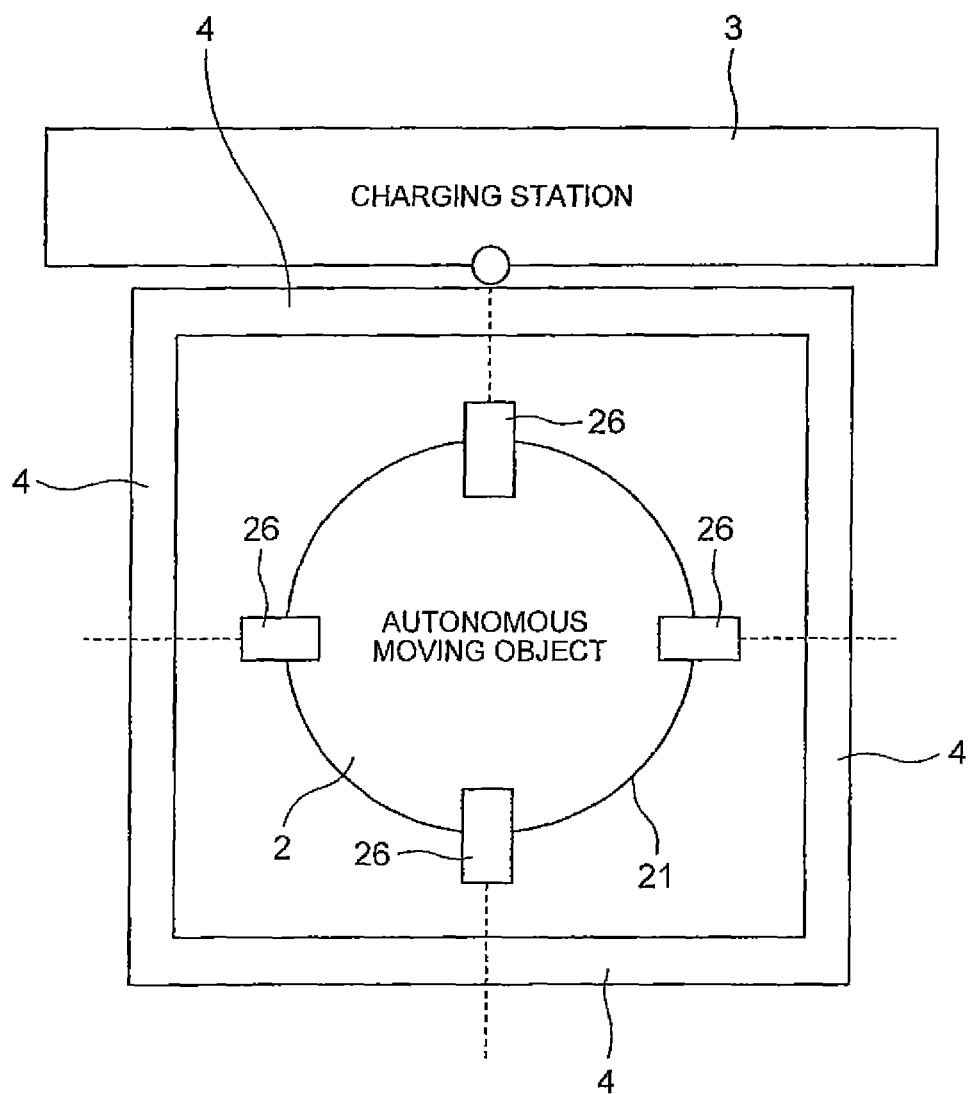
FIG. 6 is a diagram illustrating an example where mirrors are arranged so as to surround four sides of the autonomous moving object on the road surface which is subjected to measurement by distance sensors in Embodiment 2 of the invention.

As illustrated in FIG. 6, when four distance sensors 26 are arranged at equal intervals on the outer circumference of the autonomous moving object 2, the mirrors 4 are arranged on the road surface, which is subjected to measurement by the distance sensors 26, so as to surround four sides of the autonomous moving object 2. Accordingly, it is possible to simultaneously check the abnormality in the four distance sensors 26. In the example, the autonomous moving object includes three and four distance sensors, and the same that is true when the autonomous moving object includes three and four distance sensors is true when the autonomous moving object includes two or five or more distance sensors. That is, the mirrors 4 are arranged on the road surface which is subjected to measurement by the distance sensors 26 when the autonomous moving object 2 is positioned with respect to the charging station 3. The determination unit 271 can check the abnormality in the distance sensors 26 by determining whether the distances to the stepped portion 4 measured by the distance sensors 26 are greater than the threshold value.

Figure 7:
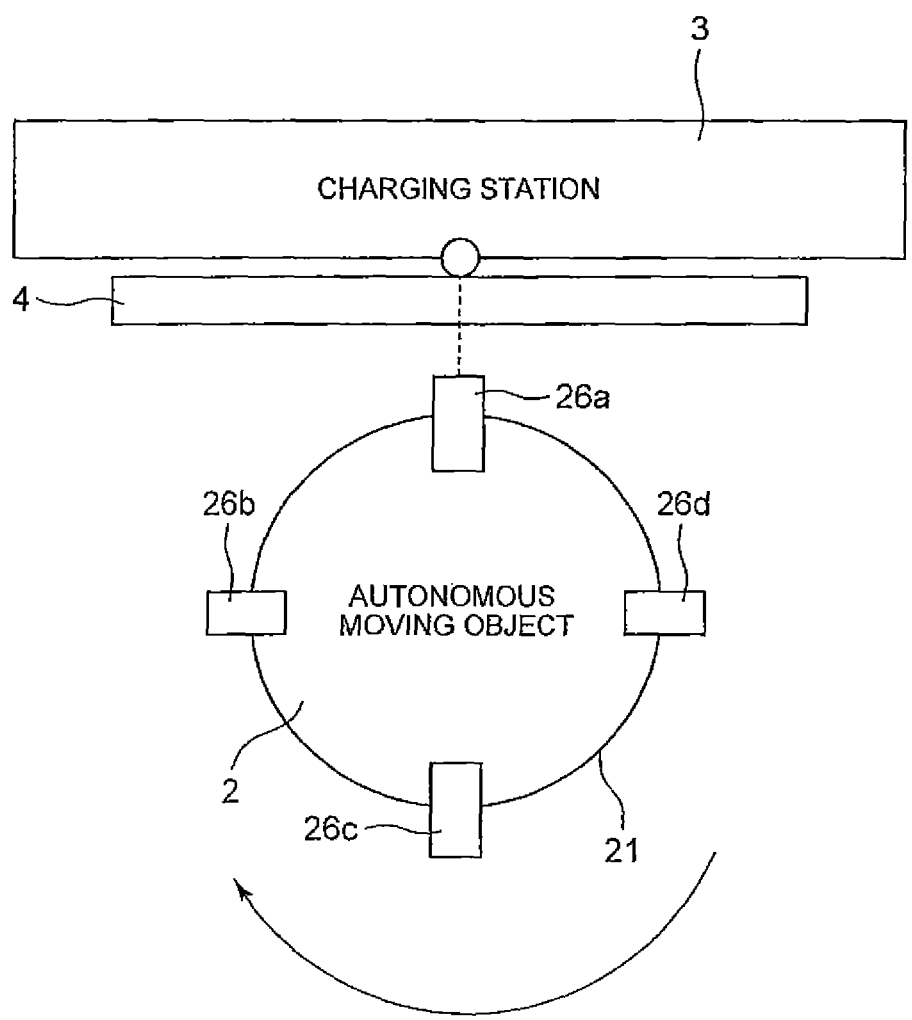
FIG. 7 is a diagram illustrating an example where a single mirror is arranged on the road surface, which is subjected to measurement by distance sensors, on the front side of a charging station in Embodiment 2 of the invention.

As illustrated in FIG. 7, one mirror 4 may be arranged on the road surface which is subjected to measurement by the distance sensors 26 on the front side of the charging station 3. In this case, at the position at which the autonomous moving object 2 is connected to the charging station 3 and is positioned, the distance sensor 26a measures the distance to the mirror 4 on the road surface and the determination unit 271 of the controller 27 determines whether the distance measured by the distance sensor 26a is less than a threshold value. Then, the autonomous moving object 2 is disconnected from the charging station 3 and rotates by 90° at that position. In this state, the distance sensor 26b measures the distance to the mirror 4 on the road surface and the determination unit 271 determines whether the distance measured by the distance sensor 26b is less than the threshold value. Subsequently, the autonomous moving object 2 rotates by 90° at that position. In this state, the distance sensor 26c measures the distance to the mirror 4 on the road surface and the determination unit 271 determines whether the distance measured by the distance sensor 26c is less than the threshold value. The autonomous moving object 2 further rotates by 90° at that position. In this state, the distance sensor 26d measures the distance to the mirror 4 on the road surface and the determination unit 271 determines whether the distance measured by the distance sensor 26d is less than the threshold value. In this way, it is possible to determine the abnormality in the four distance sensors 26 of the autonomous moving object using the single mirror 4.

In Embodiment 2, the other configuration is substantially the same as in Embodiment 1, corresponding elements will be referenced by same reference numerals, and detailed description thereof will not be repeated. According to Embodiment 2, it is possible to automatically check the abnormality in the plural distance sensors 26 at the time of charging the battery of the autonomous moving object 2.

The invention is not limited to the above-mentioned embodiments and can be appropriately modified without departing from the gist thereof.

Figure 8:
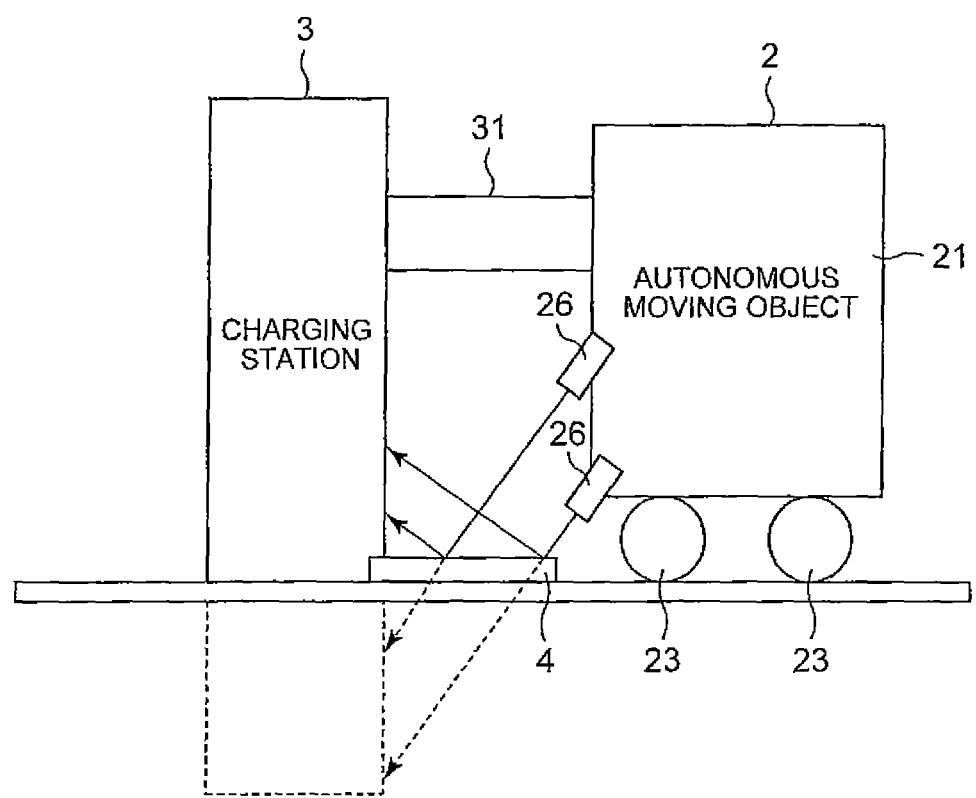
FIG. 8 is a diagram illustrating an example where the invention is applied to an autonomous moving object detecting a stepped portion or an obstacle on the basis of distances detected by two distance sensors in another embodiment of the invention.

The above-mentioned embodiments can be applied to an autonomous moving object 2 that includes two distance sensors 26 detecting distances on a road surface in the moving direction and that detects a stepped portion or an obstacle on the basis of the distances detected by the distance sensors 26. A mirror 4 is arranged on a road surface which is subjected to measurement by the distance sensors 26 when the autonomous moving object 2 is positioned by connection to the connection terminal 31 of the charging station 3 (FIG. 8). The determination unit 271 can determine the abnormality in the distance sensors 26 by determining whether the distances to the mirror 4 measured by the distance sensors 26 in a state where the autonomous moving object 2 is positioned by connection to the connection terminal 31 of the charging station 3 are greater than the threshold values.

The abnormality in the distance sensors 26 may be determined by causing the mirror 4 to move to the autonomous moving object 2 side from the charging station 3 side when the autonomous moving object 2 is positioned by connection to the connection terminal 31 of the charging station 3.

Figure 9:
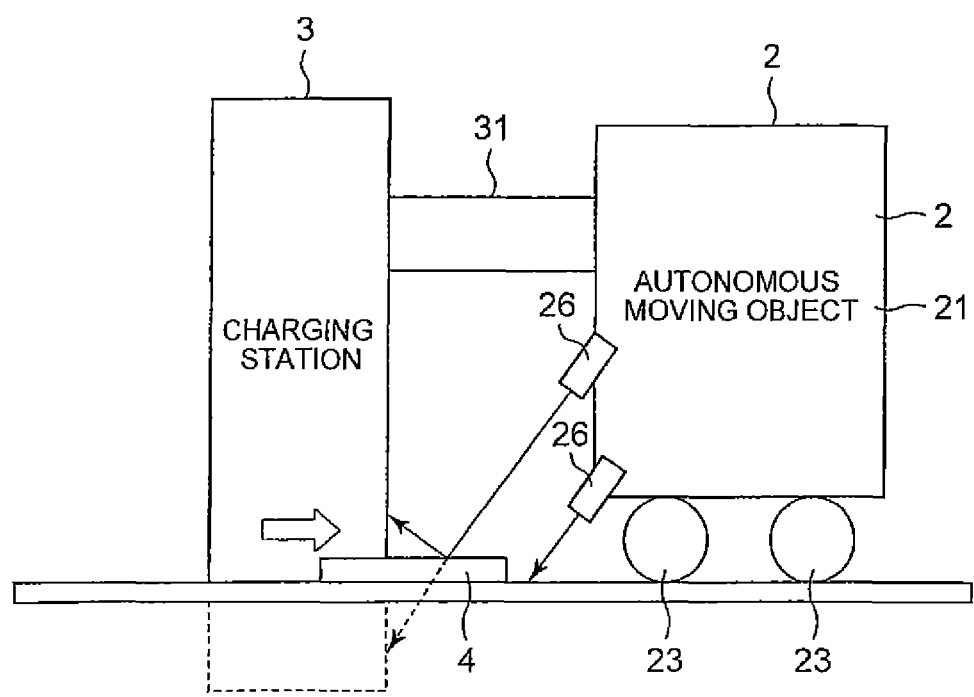
FIG. 9 is a diagram illustrating an example where the invention is applied to an autonomous moving object detecting a stepped portion or an obstacle on the basis of distances detected by two distance sensors in still another embodiment of the invention.

For example, in the state illustrated in FIG. 9, since the distance measured by the upper distance sensor 26 includes the reflected light path of the mirror 4, the upper distance sensor 26 detects a stepped portion. On the other hand, since the distance measured by the lower distance sensor 26 does not include the reflected light path of the mirror 4, the lower distance sensor 26 detects the horizontal road surface. Then, when the mirror 4 is made to move to the autonomous moving object 2 side (after Δt seconds), as illustrated in FIG. 8, the distances measured by the upper and lower distance sensors 26 include the reflected light path of the mirror 4 and thus the upper and lower distance sensors 26 detect the stepped portion. Accordingly, it is determined whether the lower distance sensor 26 normally detects the stepped portion by moving the mirror 4 instead of moving the autonomous moving object 2. By fixing the mirror 4 and actually moving the autonomous moving object 2 (for example, causing the autonomous moving object 2 to move backward from the charging station 3), it may be determined whether the distance sensor 26 is abnormal.

In the above-mentioned embodiments, the determination unit 271 of the controller 27 is disposed in the autonomous moving object 2, but may be disposed in the charging station 3.

In the above-mentioned embodiments, a convex portion may be formed as the stepped portion 4. In Embodiments 1 and 2, the mirror 4 is arranged and the concave portion is formed as the stepped portion 4. In this case, it can be checked whether the distance sensor 26 can normally measure the actual concave stepped portion. On the other hand, by forming a convex portion as the stepped portion 4, it can be checked whether the distance sensor 26 can normally measure the actual convex stepped portion.

In the above-mentioned embodiments, the autonomous moving object 2 is positioned with respect to the charging station 3 by connecting the connection portion 28 of the autonomous moving object 2 to the connection terminal 31 of the charging station 3 in a contacting manner, but the invention is not limited thereto. By connecting the connection portion 28 of the autonomous moving object 2 to the connection terminal 31 of the charging station 3 in a non-contacting manner, the autonomous moving object 2 may be positioned with respect to the charging station 3.

Figure 10:
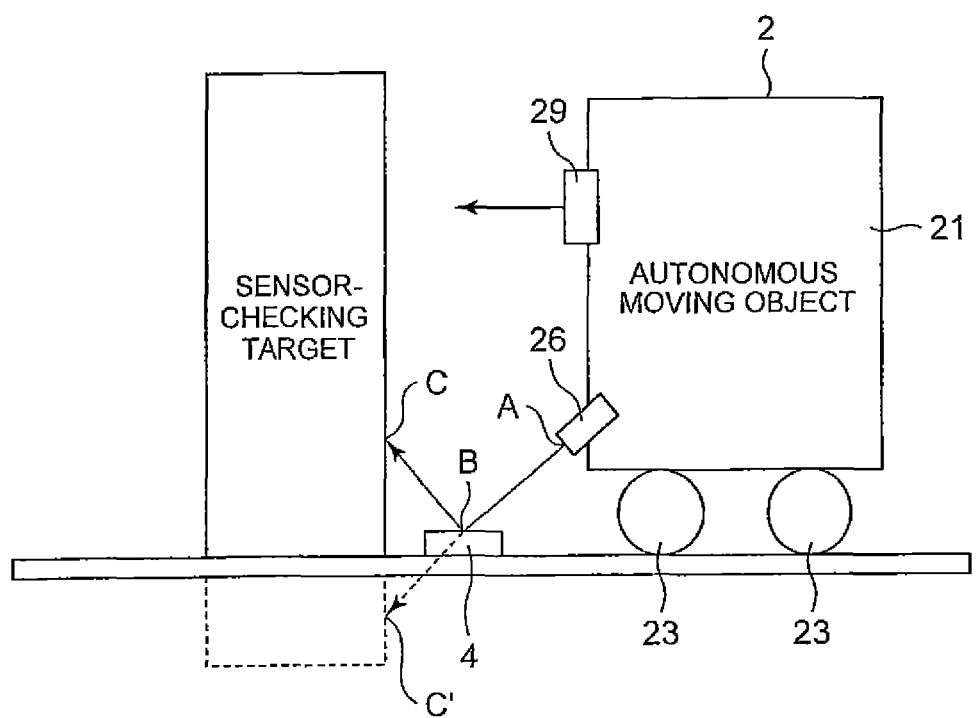
FIG. 10 is a diagram illustrating an example where a mirror is arranged on a road surface which is subjected to measurement by distance sensors when an autonomous moving object is positioned at a predetermined position in still another embodiment of the invention.

In the above-mentioned embodiments, the autonomous moving object 2 may recognize a sensor-checking target used to check the distance sensor 26 using a sensor 29 other than that used for the determination, such as an image sensor including a camera, an ultrasonic sensor, an infrared sensor, and a millimeter wave sensor. For example, the autonomous moving object 2 recognizes a predetermined target used to check the sensor on the basis of an image captured by the camera and moves to a predetermined position set in the vicinity of the sensor-checking target (FIG. 10). The mirror 4 is arranged on the road surface which is subjected to measurement by the distance sensor 26 when the autonomous moving object 2 is positioned at the predetermined position. By causing the determination unit 271 of the controller 27 to determine whether the distance to the mirror 4 measured by the distance sensor 26 in the state where the autonomous moving object 2 is positioned at the predetermined position is greater than the threshold value, it is possible to determine the abnormality in the distance sensor 26. Accordingly, it is possible to determine the abnormality in the distance sensor 26 at an arbitrarily-set position.

An aspect of the invention may provide an abnormality determination system including: an autonomous moving object that includes at least one distance measuring unit disposed to face a road surface in the moving direction and configured to measure a distance to the road surface, a detection unit configured to detect a predetermined position; a stepped portion disposed on the road surface which is subjected to measurement by the distance measuring unit when the autonomous moving object is positioned at the predetermined position; and a determination unit determining whether the distance to the stepped portion measured by the distance measuring unit at the time of positioning is less than a threshold value.

What is claimed is:

1. An abnormality determination system comprising:
   an autonomous moving object including a distance measuring unit that is disposed to face a road surface in a moving direction and that measures a distance to the road surface;
   a charging unit including a connection terminal for charging a battery of the autonomous moving object;
   a stepped portion disposed on a road surface which is subjected to measurement by the distance measuring unit when the autonomous moving object is connected to the connection terminal of the charging unit and is positioned at a predetermined position, the stepped portion being a reflecting portion configured to reflect a signal output from the distance measuring unit; and
   a determination unit configured to (i) determine whether a distance to the stepped portion measured by the distance measuring unit at a time of positioning of the autonomous moving object at the predetermined position is less than a threshold value, and (2) determine that the distance measuring unit is abnormal when the distance to the stepped portion, including the reflected light path of the reflecting portion, measured by the distance measuring unit at the time of positioning of the autonomous moving object is greater than the threshold value.

2. The abnormality determination system according to claim 1, wherein the stepped portion is a concave portion or a convex portion.

3. The abnormality determination system according to claim 1, wherein the distance measuring unit includes a plurality of distance measuring units, and
   the stepped portion include a plurality of stepped portions formed on each road surface which is subjected to measurement by the plurality of the distance measuring units at the time of positioning of the autonomous moving object.

4. A method of determining abnormality in a distance measuring unit measuring a distance to a road surface in an abnormality determination system including an autonomous moving object, the autonomous moving object including the distance measuring unit disposed to face the road surface in a moving direction, and a charging unit including a connection terminal for charging a battery of the autonomous moving object, the method comprising:
   measuring a distance to a stepped portion by the distance measuring unit when the autonomous moving object is positioned at a predetermined position by connection to the connection terminal of the charging unit, the stepped portion being disposed on a road surface which is subjected to measurement by the distance measuring unit at a time of positioning of the autonomous moving object at the predetermined position and being a reflecting portion configured to reflect a signal output from the distance measuring unit;

determining whether the measured distance is less than a threshold value; and determining that the distance measuring unit is abnormal when the distance to the stepped portion, including the reflected light path of the reflecting portion, measured by the distance measuring unit at the time of positioning of the autonomous moving object is greater than the threshold value.

* * * * *